United States Patent [19]

Bäbler et al.

[11] Patent Number: 5,387,281
[45] Date of Patent: Feb. 7, 1995

[54] COMPOSITIONS BASED ON 2,9-DICHLOROQUINACRIDONE PIGMENTS

[75] Inventors: Fridolin Bäbler, Hockessin; Charles G. Orange, Bear, both of Del.

[73] Assignee: Ciba-Geigy Corporation, Ardsley, N.Y.

[21] Appl. No.: 159,642

[22] Filed: Dec. 1, 1993

[51] Int. Cl.⁶ .............................................. C09B 48/00
[52] U.S. Cl. .................................... 106/495; 106/493; 106/494; 106/497; 106/498; 523/1
[58] Field of Search ............... 106/495, 494, 493, 497, 106/498; 523/1

[56] References Cited

U.S. PATENT DOCUMENTS

| | | | |
|---|---|---|---|
| 4,865,650 | 9/1989 | von der Crone et al. | 106/494 |
| 5,030,734 | 7/1991 | Bäbler | 106/494 |
| 5,095,056 | 3/1992 | Bäbler et al. | 524/90 |
| 5,194,088 | 3/1993 | Babler et al. | 106/412 |

FOREIGN PATENT DOCUMENTS 042816 12/1981 European Pat. Off.
321397 6/1989 European Pat. Off. ............ 106/494

*Primary Examiner*—Helene Klemanski
*Assistant Examiner*—Scott L. Hertzog
*Attorney, Agent, or Firm*—George R. Dohmann

[57] ABSTRACT

The present invention relates to a heat stable red pigment composition comprising a 2,9-dichloroquinacridone and a bis-(4, 5,6,7-tetrachloroisoindolin-1-on-3-ylidene)-phenylene-1,4-diamine pigment and a process for its preparation. The red pigment compositions are particularly useful for pigmenting engineering plastics.

21 Claims, No Drawings

COMPOSITIONS BASED ON 2,9-DICHLOROQUINACRIDONE PIGMENTS

SUMMARY

The present invention relates to a heat stable red pigment composition comprising a 2,9-dichloroquinacridone and a bis-(4, 5,6,7-tetrachloroisoindolin- 1 -on-3-ylidene )-phenylene-1,4-diamine pigment and a process for its preparation. The red pigment compositions are particularly useful for pigmenting engineering plastics.

BACKGROUND

The object of the present invention is to provide a red colored quinacridone pigment of high saturation which has the heat stability and weatherability for utility as a replacement for heavy metal pigments in engineering plastics. This object is achieved by the preparation of red colored pigment compositions by a process comprising the steps of premilling a pigment mixture of 2,9-dichloroquinacridone pigment and bis-(4,5,6,7-tetrachloroisoindolin-1-on-3-ylidene)-phenylene-1,4-diamine pigment, and subsequently heating a suspension of the premilled pigment mixture in a polar solvent to an elevated temperature.

Quinacridones are valuable pigments. The gamma crystal modification of the unsubstituted quinacridone, C.I. Pigment Violet 19, is known for its attractive red color. Although it is of coloristic interest, the red-colored gamma-phase of unsubstituted quinacridone possesses insufficient heat stability to have utility for pigmenting the engineering plastics.

The U.S. Pat. No. 5,095,056 discloses a pigmentary 2,9-dichloroquinacridone having a specific surface area below 30 m$^2$/g with good heat stability. Due to its very large particle size, the color is shifted to a unique red color shade from the known magenta color of smaller particle size 2,9-dichloro-quinacridone. However, its color is still in the magenta region and readily distinguishable from red the color shade of an unsubstituted gamma quinacridone. Thus, no red quinacridone pigment is known to possess the heat stability required for utility as a pigment for the engineering plastics.

Isoindolinone pigments, particularly C.I. Pigment Yellow 110, are known to possess good heat stability and good weatherability.

EP 042,816 describes a process for the preparation of pigment alloys by submitting pigment mixtures containing at least two pigments of the perylene, phthalocyanine, perinone, quinacridone, quinaphtholone, isoindolinone, isoindoline, dioxazine, anthraquinone, thioindigo, azo, and azo methine pigment class to a wet milling process. However, mixtures of 2,9-dichloroquinacridone and a isoindolinone pigment which are prepared according to the disclosed procedures are very small particle size pigments which possess insufficient heat stability for use in engineering plastics.

The present invention is based on the discovery that red pigment compositions, which possess high saturation, excellent weatherability and the outstanding heat stability required for utility as a pigment in engineering plastics, can be obtained according to the present process. In addition, the pigments prepared according to the present process are highly dispersible in the plastic medium to be pigmented. Thus, the inventive compositions provide a red quinacridone pigment which is suitable for the utility of pigmenting engineering plastics.

DETAILED DESCRIPTION

The present invention relates to a process for preparing a red pigment composition which is suitable for pigmenting engineering plastics. The red pigment compositions are a pigment mixture comprising (A) 2,9-dichloroquinacridone and (B), bis-(4,5,6,7-tetrachloroisoindolin-1-on-3-ylidene )-phenylene-1,4-diamine.

Component (A), 2,9-dichloroquinacridone, is known as a pigment and can be prepared by known methods, for example by oxidizing 2,9-dichloro-6,13-dihydroquinacridone.

The isoindolinone pigment (B), bis-(4,5,6,7-tetrachloro-isoindolin-1-on-3-ylidene)-phenylene-1,4-diamine, is also known can be prepared by known methods.

The compositions of the present invention are prepared by fast premilling a mixture containing both of the two pigments identified above. After the premilling step, the premilled pigment mixture is subjected to an aftertreatment wherein the premilled pigment mixture is converted to pigmentary form by heating a suspension of the premilled pigment mixture in a polar solvent to an elevated temperature, usually above about 60° C., preferably from 70° to 100° C., most preferably from 85° to 95° C. In general, the suspension is heated for a period of at least about 1 hour during the aftertreatment. The pigment composition is then isolated by known methods.

Premilling as used in this application generally refers to milling in the complete absence of liquids. However, a liquid such as a phase directing solvent or a surface active agent can be present in small amounts, usually up to a maximum of about 10% by weight, based on the weight of the pigment mixture. The pigment mixture should retain the characteristics of a powder.

Premilling operations are known and can be accomplished in various ways. Thus, it is possible to premill with steel bails and roofing nails, or to avoid metal attrition and the corresponding need for pigment extraction with dilute acid, premilling can be accomplished with high density, high alumina ceramic balls or rods. Ceramic beads of 0.5 to 2.5 cm size made from crystalline zirconia phase and amorphous silica phase by fusion of the oxides are particularly suitable. Although a variety of sizes of grinding media can be used, the aforementioned sizes are preferred.

Many suitable grinding apparatus are also known. Examples of such suitable apparatus include a ball mill, or an attritor mill filled with metal or porcelain balls, preferably stainless steel or ceramic beads.

In a preferred procedure, the pigment mixture is premilled in the presence of 10–30% inorganic salt such as NaCl, CaCl$_2$, Na$_2$SO$_4$ or Al$_2$(SO$_4$)$_3$ with or without water of hydration. A preferred milling mixture composition is from about 75 to 85% pigment mixture and from about 15 to 25% of anhydrous Na$_2$SO$_4$. The salt is primarily present to suppress the potential explosive nature of the resulting millpowder.

A preferred means of accomplishing the premilling step is to premill the pigment mixture in an attritor mill, in the absence of a salt, under nitrogen, using stainless steel or ceramic beads as grinding media.

The premilled pigment mixture is separated from the grinding media by sieving or another suitable method.

The premilled pigment mixture is then suspended in the polar solvent. The suspension is stirred and heated to an elevated temperature, usually above about 60° C., preferably from 70° to 100° C., most preferably from 85° to 95° C. In general, the suspension is heated for a period of at least about 1 hour during the aftertreatment.

Any polar solvent is suitable for use in the aftertreatment. However, polar organic solvents such as N,N-dimethylformamide, N,N-dimethylacetamide, N,N-tetramethylurea, N-methylpyrrolidone, N-methylformamide, tetramethylene sulfone and dimethylsulfoxide are especially suitable for use as the polar solvent. N,N-dimethylformamide, N-methylpyrrolidone and dimethylsulfoxide are preferred polar solvents. Dimethylsulfoxide is the most preferred polar solvent.

The polar solvent is generally present in an amount ranging from 6 to 20 times the weight of pigment mixture, preferably 8 to 14 times the weight of the pigment mixture.

It is believed that contact of the premilled powder with the solvent causes the aggregated pigment powder to deaggregate and undergo particle ripening. The ripening process can be easily controlled as function of time and/or temperature. In general, longer times and/or higher temperatures will favor particle growth and lead to a product with a relatively reduced specific surface area.

Surprisingly, the process according to this invention yields a very homogenous red pigment. Homogeneous in this context meaning that no yellow component is visible when the pigment suspension is observed under a light microscope at 100×magnification.

After completion of the aftertreatment, the pigment is isolated, for example, by filtration and washed with a solvent, preferably an alcohol like methanol, ethanol or isopropanol and/or water and dried.

The red pigment composition thus obtained generally has a specific surface area of from about 35 to 55 m²/gram, preferably from 45 to 53 m²/gram, most preferably about 50 m²/gram. The particle size is generally in the range of from about 0.05 to 0.3 μm.

It is unexpected that a quinacridone pigment composition with a specific surface area in the range described above would possess the heat stability required for utility as a pigment in engineering plastics because the known highly heat stable magenta 2,9-dichloroquinacridone pigment preferably has a smaller specific surface area.

Depending on the end use, it can be advantageous to add texture improving agents to the pigment mixture at the beginning or end of the aftertreatment, preferably by blending into the aqueous presscake. Suitable texture improving agents are, in particular, fatty acids of not less than 18 carbon atoms, for example stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecane-1,2-diol, and also modified colophonium/maleate resins or fumaric acid/colophonium resins or polymeric dispersants. The texture improving agents are preferably added in amounts of 0.1 to 30% by weight, most preferably of 2 to 15% by weight, based on the final product.

The present invention also relates to red pigment compositions which comprise a uniform mixture of (A) 2,9-dichloroquinacridone pigment of formula (I),

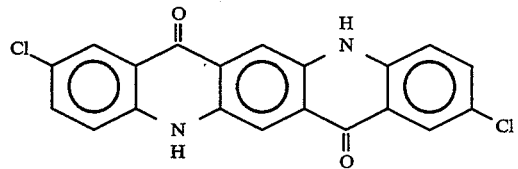

and (B) a bis-(4,5,6,7-tetrachloroisoindolin-1-on-3-ylidene)-phenylene-1,4-diamine pigment of formula (II)

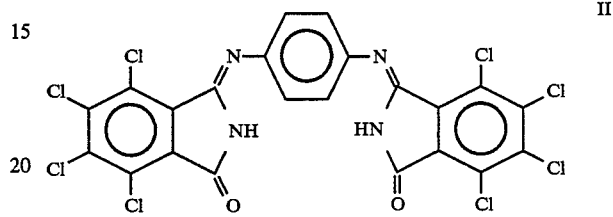

In general, the present pigment compositions contain from about 50 to 95 percent, preferably 65 to 85 percent, by weight, based on the combined weights of components (A) and (B), of component (A), and 5 to 50 percent, preferably 15 to 35 percent, most preferably 20 to 30 percent, by weight of component (B).

In comparison to mixtures of the pigment crudes of 2,9-dichloroquinacridone and bis-(4,5,6,7-tetrachloroisoindolin-1-on-3-ylidene)-phenylene-1,4-diamine pigment, the new compositions of this invention possess a higher saturation and heat stability when applied in engineering plastics.

The present compositions are highly suitable for coloring high molecular weight materials, which can be processed to casted and molded articles.

The pigment compositions are normally utilized to pigment high molecular weight organic materials, in particular engineering plastics. Suitable high molecular weight organic materials include thermoplastics, thermoset plastics or elastomers, for example, cellulose ethers; cellulose esters such as ethyl cellulose; linear or crosslinked polyurethanes; linear, crosslinked or unsaturated polyesters; polycarbonates, polyolefins such as polyethylene, polypropylene, polybutylene or poly-4-methylpent-1-ene; polystyrene; polysulfones; polyamides, polycycloamides, polyimides, polyethers, polyether ketones such as polyphenylene oxides, and also poly-p-xylene, polyvinyl halides such as polyvinyl chloride, polyvinylidene chloride, polyvinylidene fluoride or polytetrafluoroethylene, acrylic polymers such as polyacrylates, polymethacrylates or polyacrylonitrile, rubber, silicone polymers, phenol/formaldehyde resins, melamine/formaldehyde resins, urea/formaldehyde resins, epoxy resins, styrene butadiene rubber, acrylonitrile-butadiene rubber or chloroprene rubber, singly or in mixtures.

Generally, the compositions are used in an amount of 0.01 to 30% by weight, preferably 0.1 to 10% by weight, based on the weight of the high molecular weight organic material to be pigmented. Thus, the present invention also relates to a pigmented plastic composition which comprises a plastic material and from 0.01 to about 30 percent by weight, based on the weight of said pigmented plastic composition, of a pigment composition of the present invention, and to a process for preparing said pigmented plastic compositions.

Many organic pigments demonstrate insufficient heat stability to be used in engineering plastics. This poor heat stability is believed to be due to partial solubility of the pigment at high temperatures, thereby producing fluorescence when the colored parts are viewed under UV light. Colored engineering plastics containing the present pigment compositions are substantially fluorescence free and show a minimal change in color at elevated temperatures, in particular for the temperature range of 400° F. to 600° F. Thus, the dulling and/or change of color related to the exposure to elevated temperatures or different light sources are substantially eliminated by the present pigment compositions.

Pure, high chroma, useful new color shades can be obtained when the present pigment compositions are mixed with other organic and/or inorganic pigments and/or polymer soluble dyes. Furthermore, the present pigment compositions are highly dispersible and can be readily incorporated into organic matrixes to provide homogenous colorations possessing high opacity and saturation and excellent light and weather fastness properties.

The high molecular weight organic materials are pigmented with the pigment compositions of present invention by mixing the composition, if desired in the form of a masterbatch, into substrates using high shear techniques including roll mills or a mixing or grinding apparatus. The pigmented material is then brought into the desired final form by known methods, such as calendering, pressing, extruding, brushing, casting or injection molding. The pigmented molded articles utilizing the present compositions are, in particular, those obtained by orienting stress, for example, molding and casting, ribbons, fibers or rolled sheets.

Non-rigid moldings can be produced, or polymer brittleness can be reduced, by incorporating plasticizers into the high molecular weight compounds before the shaping operation. Suitable plasticizers include, for example, esters of phosphoric acid, phthalic acid or sebacic acid. Plasticizers can be incorporated into the polymers either before or after the incorporation of the pigment composition of this invention.

Due to its excellent weatherability, the pigment of this invention can also be used for coating compositions such as solvent- or water-based automotive coatings.

The following examples further describe embodiments of this invention. In these examples all parts given are by weight unless otherwise indicated.

EXAMPLE 1A

A 1-SDG ATTRITOR mill manufactured by UNION Process, Inc., Akron, Ohio, is charged with 375 grams 2,9-dichloroquinacridone crude and 125 grams bis-(4,5,6,7-tetrachloroisoindolin-1-on-3-ylidene)-phenylene-1,4-diamine, IRGAZIN Yellow 3RLTN (CIBA-GEIGY Corp.). The mill is fitted with L-arms and charged with 3.78 liters of 0.6 cm diameter stainless steel beads grinding media. The mill is then rotated at 500 RPM under nitrogen for 90 minutes. At the conclusion of the milling cycle, the premilled pigment mixture is recovered by opening the valve at the bottom of the mill while rotation continues for 15 minutes, yielding 494 grams highly aggregated dark red premill powder.

EXAMPLE 1B

A 3 liter flask equipped with a stirrer, thermometer and condenser is charged with 1800 ml dimethylsulfoxide (DMSO) and 180 grams of the above described premill powder (Example 1A). The suspension is heated to 95° C. and stirred for 6 1/4 hours at 95° C. The hot pigment suspension is filtered and the presscake washed with methanol followed by water until DMSO free and then dried at 80° C. in an oven, yielding 178 grams red pigment composition. The pigment composition has a specific surface area of 48.7 m2/g determined by the BET-method. An electron micrograph shows a uniform particle size in the range of about 0.05 to 0.3 μm.

When incorporated into high performance plastics by an extrusion technique at a pigment concentration of 0.5%, by weight, the pigment composition imparts a red color with excellent fastness properties.

EXAMPLE 2

A 500 ml flask equipped with a thermometer, stirrer and condenser is charged with 15 grams premill powder obtained according to procedure described in Example 1A and 150 ml dimethylformamide. The pigment suspension is stirred for 5 1/2 hours at 85° C. The pigment is isolated by filtration, the presscake is washed with methanol followed by water and dried at 80° C. in an oven, yielding 14. 1 grams of a red pigment composition which shows excellent heat stability when incorporated in a high performance plastic.

EXAMPLE 3

The procedure of Example 2 is repeated using N-methyl pyrrolidone as solvent and with continued stirring for 6 1/2 hours at 90° C. to yield a red pigment composition of good heat stability and fastness properties.

EXAMPLE 4

Five grams of pigment composition prepared according to Example 1B, 2.5 grams CHIMASORB 944 LD (hindered amine light stabilizer), 1.0 gram TINUVIN 328 (benzotriazole UV absorber), 1.0 gram IRGANOX 1010 (hindered phenol antioxidant) and 1.0 gram IRGANOX 168 (phosphite process stabilizer) (all additives from CIBA-GEIGY Corp.) are mixed in a BANBURY mixer together with 1000 grams of high density polyethylene, QUANTUM MICROTHENE MA-778 from U.S.I QUANTUM Chem. at a speed of 175–200 rpm for 30 seconds after flux. The fluxed pigmented resin is chopped up while warm and malleable, and then fed through a granulator. The resulting granules are molded on a BATTENFELD 1000 injection molder with a 5 minute dwell time and a 30-second cycle time at temperatures of 205° C. (400° F.), 260° C. (500° F.), and 315° C. (600° F.), respectively. Uniformly colored chips were obtained showing a similar red color at each of the temperature steps demonstrating the excellent heat stability of the pigment composition prepared according to the present process.

EXAMPLE 5

The following mixture is prepared in a fluid mixer by stirring for about 5 minutes at a speed of 1400 rpm.
  92.0 grams—vinyl resin (VINNOL H65D, WACKER)
  8.0 grams—vinyl copolymer (VESTOLIT HIS 7587, HüLS)

1.5 grams—epoxidized soya bean oil plasticizer
2.8 grams—barium/cadmium stabilizer
0.7 grams—organic phosphite auxiliary stabilizer (IRGASTAB CH-300, CIBA-GEIGY)
0.4 grams—fatty acid ester (IRGAWAX 370, CIBA-GEIGY)
0.2 grams—paraffin oil derivative lubricant (IRGAWAX 360, CIBA-GEIGY)
0.25 grams—benzotriazole derivative light stabilizer (TINUVIN 320, CIBA-GEIGY)

A mixture of 25 pans by weight of the rigid PVC mixture so obtained is combined with 0.25 parts by weight of a pigment composition which was prepared according Example 1B and mixed in a HENSCHEL mixer at room temperature for about 3 minutes at a speed of about 2000 rpm. The pigmented rigid PVC so obtained is pressed on a roll mill for 6 minutes at 190° C., 25 rpm and a friction of 1:1.2, and then pressed at 190° C. for 6 minutes on a BURKLE press between chromium-plated steel plates to a thickness of about 1mm. The pressed sheet so obtained is of red color exhibiting excellent fastness to light and weathering.

EXAMPLE 6

The procedure of Example 4 is repeated using polypropylene, HIMONT PRO-FAX 6401 from HIMONT, instead of high density polyethylene as a substrate to yield red colored chips which show excellent heat and lightfastness properties.

EXAMPLE 7

Six grams of a pigment composition according Example 1B, 9 grams TINUVIN 770 (hindered amine light stabilizer) 3 grams TINUVIN 328 (benzotriazole UV absorber), 3 grams IRGANOX 245 (hindered phenol antioxidant), all additives from CIBA-GEIGY Corp., are mixed in a BANBURY mixer together with 1200 grams ABS resin GPM 5600 from GENERAL ELECTRIC at a speed of 175–200 rpm for 30 seconds after flux. The fluxed pigmented resin is chopped up while warm and malleable, and then fed through a granulator. The resulting granules are molded on a BATTENFELD 1000 injection molder with a 7 minute dwell time and a 42-second cycle time at temperatures of 232° C. (450° F.) and 288° C. (550° F.) respectively. Uniformly colored chips which show similar red color shades at each of the temperature steps are obtained. No fluorescence is observed by viewing the chips under UV-light.

The weatherability of the above obtained chips was determined by exposing them to a Xenon SAE J-1960 automotive exterior weathering procedure. The total color difference values, $\Delta E$, were measured on a color spectrophotometer with D-65 illuminant, C.I.E. lab scale and 10 degree observer with a specular component included. The exposed chips show a $\Delta E$ of only 0.8 as compared to the unexposed chips. This result demonstrates the excellent fastness properties of the red pigment composition obtained according to this invention.

EXAMPLE 8

The procedure of Example 7 is repeated using a blend of 75% commercially available 2,9-dichloroquinacridone and 25% commercially available bis-(4,5,6,7-tetrachloroisoindoline-1-on-3-ylidene)-phenylene-1,4-diamine pigment instead of the pigment composition of this invention. A yellowish fluorescence is observed by exposing the chips molded at 288° C. to UV light.

EXAMPLE 9A 1.6 grams of the pigment composition obtained according Example 1B are predispersed in 2.4 grams of epoxidized soyabean oil type G-62 from ROHM & HAAS by mixing it with a spatula.

150 grams clear master batch medium hard polyvinyl chloride POLYFLEX from DAYON are rolled on a two-roll calendar at 292° F.–298° F. by constant folding, removal and feeding. 2.8 grams of the above described pigment/soyabean oil dispersion are added into the rolling hot PVC sheet and the sheet is rolled another ten times by constant folding, removal and feeding. The resulting medium hard PVC sheet is colored in a uniform strong red color shade with excellent lightfastness properties.

EXAMPLE 9B

The procedure of Example 9A is repeated except that a blend of commercially available large particle size 2,9-dichloro quinacridone and 25% commercially available bis-(4,5,6,7-tetrachloroisoindoline-1-on-3-ylidene)-phenylene-1,4-diamine pigment is used. The red colored PVC sheet obtained has a much lower saturation when compared to the PVC sheet colored with the pigment composition of this invention.

EXAMPLE 9C

For comparison with the color shade of a pure large particle size 2,9-dichloroquinacridone the procedure of Example 9A is repeated using 1.6 grams of commercially available 2,9-dichloroquinacridone having a specific surface area of about 21 $m^2$/gram, instead of the pigment composition of this invention, yielding a magenta red colored PVC sheet. The total color difference values $\Delta L$, $\Delta A$, $\Delta B$, $\Delta E$ were measured on a color spectrophotometer with D-65 illuminant, C.I.E. labscale and 10 degree observer with a secular component included. Measuring the red colored PVC sheet from Example 9A versus the red-magenta colored PVC sheet from Example 9C the following data was observed $\Delta L:+1.94$, $\Delta A:+3.98$, $\Delta B:+3.83$, $\Delta E:5.85$. Thus, the PVC sheet containing the new pigment composition of this invention manifests a lighter, yellower red shade with higher saturation.

EXAMPLE 10

A three mixtures each containing 100 g of polyethylene terephthalate granules and 1.0 g of a composition prepared according to one of Examples 1B, Example 2 or Example 3 are blended for 15 minutes in a glass bottle on a roller gear bed. Extrusion of the mixtures into ribbons in a laboratory extruder produces ribbons which are each colored in a uniform red color possessing excellent light and heat fastness.

EXAMPLE 11

The procedure described in Example 10 is repeated using APILON 52-65 1 polyurethane (API spc Mussolente, Italy) to yield red polyurethane ribbons having excellent lightfastness.

EXAMPLE 12

The procedure of Example 10 is repeated using ULTRANYL KR 4510 polyphenylene ether/polyamide blend (BASF) to yield a ribbons having a uniform red color with excellent fastness properties.

EXAMPLE 13

The procedure of Example 10 is repeated using DEGALAN G7 polymethylmethacrylate granules (DEGUSSA) to yield ribbons having a red shade with excellent fastness properties.

EXAMPLE 14

The procedure of Example 4 is repeated using VESTAMID polyamide granules (HUELS) to yield red colored chips showing excellent heat and lightfastness properties.

EXAMPLE 15

The procedure of Example 10 is repeated using polycarbonate (LEXAN from GENERAL ELECTRIC) to yield ribbons having a uniform, strong red color with excellent fastness properties.

EXAMPLE 16

A mixture of 130 grams of steatite balls of 8 mm in diameter and 47.5 grams of an alkyd melamine baking finish, which baking finish is a mixture containing 60 grams of alkyd resin (BECKOSOL 27-320 from Reichhold Chemie AG) 50% in xylene:butanol (2:1 mixture), 2 grams of xylene, 2 grams of ethylene glycol monomethyl ether and 2.5 grams of the pigment composition obtained in Example 1B, is dispersed in a 200 ml capacity glass flask with a twist-off cap on a roll stand in the course of 120 hours. After the steatite balls have been separated, 2.4 grams of the full tone mixture thus dispersed is mixed with 9.6 grams of titanium dioxide KRONOS 59 from Kronos Titan GmbH) and a further 24.0 grams of the above described alkyd melamine baking finish. The mixture thus obtained is sprayed onto aluminum panels and subsequently baked at 130° C. for 30 minutes. This resulting red finish shows excellent fastness properties.

EXAMPLE 17

A mixture of 130 grams of steatite balls (diameter: 8 mm) and 45.5 grams of a thermosetting acrylic finish, which finish is a mixture of the following composition:
- 41.3 grams of acrylic resin (VIACRYL VC373, 60%, rom VIANOVA Kunstharz AG),
- 16.3 grams of melamine resin (MAPRENAL TTX, 55% from HOECHST AG),
- 32.8 grams of xylene,
- 4.6 grams of ethylglycol acetate,
- 2.0 grams of butyl acetate and
- 1.0 grams of "Siliconoil A, 1% in xylene (BAYER AG) and
- 2.5 grams of the pigment composition obtained in Example 1B, are dispersed in a 200 ml glass flask with a twist-off seal on a roll stand in the come of 72 hours. The steatite balls are separated and 8.0 grams of the millbase, 0.6 grams of aluminum paste (ALCOA, 60–65% Al content, Aluminum Corp. of America), 1.0 grams of methyl ethyl ketone and 18.4 grams of the above mentioned thermosetting acrylic finish are thoroughly mixed and the resulting mixture is sprayed onto aluminum panels and subsequently baked at 130° C. for 30 minutes. Very strong red metallized coatings having excellent fastness properties are obtained.

In addition to the embodiments described above, numerous variations of these embodiments can be made in accordance with this invention.

We claim:

1. A process for the preparation of a pigment composition, which comprises:
   (a) premilling a pigment mixture comprising 2,9-dichloroquinacridone and bis-(4,5,6,7-tetrachloroisoindolin-1-on-3-ylidene)-phenylene-1,4-diamine to form a premilled pigment;
   (b) subsequently heating a suspension of the premilled pigment in a polar solvent at an elevated temperature above about 60° C. for a period of at least about 1 hour; and
   (c) isolating the pigment composition.

2. A process of claim 1, wherein said polar solvent is selected from the group consisting of N,N-dimethylformamide, N,N-dimethylacetamide, N,N,N',N'-tetramethylurea, N-methylpyrrolidone, N-methylformamide, tetramethylene sulfone and dimethylsulfoxide.

3. A process of claim 2, wherein said polar solvent is N-methylpyrrolidone, N,N-dimethylformamide or dimethylsulfoxide.

4. A process of claim 2 wherein said polar solvent is dimethylsulfoxide.

5. A process of claim 2, wherein said polar solvent is present in an amount of from 6 to 20 times the weight of the premilled pigment.

6. A process of claim 1, wherein the elevated temperature is from 70° to 100° C.

7. A process of claim 6, wherein the elevated temperature is from 85° to 95° C.

8. A process of claim 2 wherein the suspension is heated for from 5 to 10 hours and the elevated temperature is above 60° C.

9. A process of claim 8 wherein the pigment mixture consists essentially of from 50 to 95 percent by weight of 2,9-dichloroquinacridone and from 5 to 50 percent by weight of bis-(4,5,6,7-tetrachloroisoindolin-1-on-3-ylidene)-phenylene-1,4-diamine.

10. A process of claim 9 wherein the pigment mixture is from 20 to 30 percent by weight of bis-(4, 5,6,7-tetrachloroisoindolin-1-on-3-ylidene)-phenylene-1,4-diamine.

11. A red pigment composition which comprises a homogeneous mixture of (A) 2,9-dichloroquinacridone and (B) bis-(4,5,6,7-tetrachloro-isoindolin-1-on-3-ylidene)-phenylene-1,4-diamine having a specific surface area of from 35 to 55 $m^2$/gram.

12. A composition of claim 11, wherein the composition comprises from 50 to 95 percent by weight of component (A) and from 5 to 50 percent by weight of component (B), the percentage by weight being based on the combined weights of components (A) and (B).

13. A composition of claim 12, wherein the composition comprises 65 to 85 percent by weight of component (A) and 15 to 35 percent of component (B).

14. A composition of claim 12, wherein the composition comprises 70 to 80 percent by weight of component (A) and 20 to 30 percent by weight of component (B).

15. A composition of claim 12, wherein the specific surface area is 45 to 53 $m^2$/gram.

16. A process for preparing a pigmented high molecular weight organic material, which comprises incorporating of an effective pigmenting amount of a composition of claim 11 into said high molecular weight organic material.

17. A process of claim 16, wherein the composition is present in said high molecular weight organic material in a concentration of from 0.01 to about 30 percent by weight, based on the weight of said pigmented high molecular weight organic material.

18. A process of claim 16 wherein the high molecular weight organic material is an engineering plastic.

19. A process of claim 16, wherein said high molecular weight organic material is selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins and diene rubbers and copolymers thereof.

20. A process of claim 16, wherein said high molecular weight organic material is a solvent or water based automotive coating.

21. A pigmented high molecular weight organic composition which comprises a high molecular weight organic material and from 0.01 to about 30 percent by weight, based on the weight of said pigmented high molecular weight organic composition, of a pigment composition of claim 11.

* * * * *